United States Patent Office 3,676,283
Patented July 11, 1972

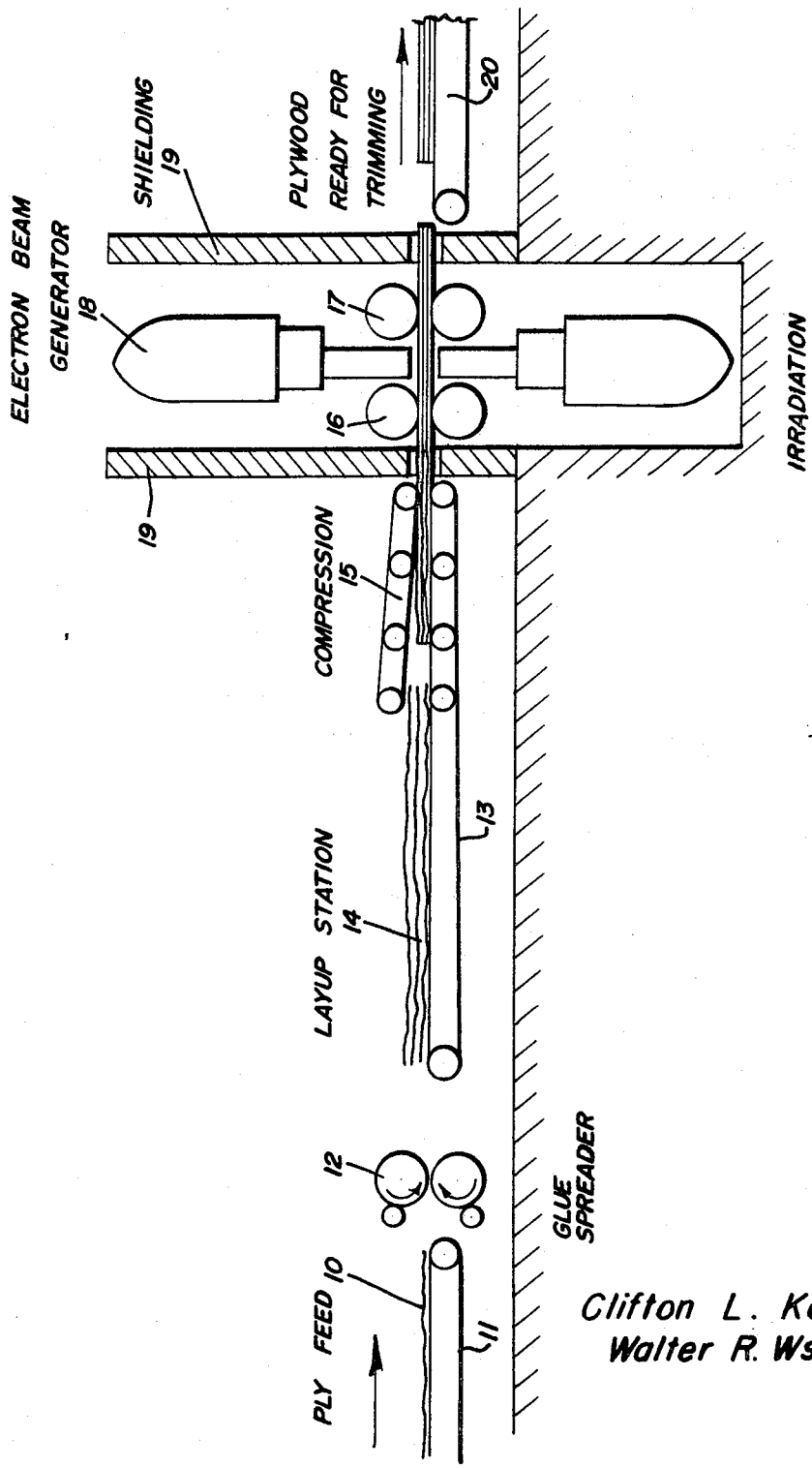

3,676,283
LAMINATE AND PROCESS FOR LAMINATING WITH POLYTHIOL POLYENE REACTION PRODUCT
Clifton L. Kehr, Silver Spring, and Walter R. Wszolek, Sykesville, Md., assignors to W. R. Grace & Co., New York, N.Y.
Continuation-in-part of application Ser. No. 617,801, Feb. 23, 1967. This application Aug. 14, 1969, Ser. No. 850,067
Int. Cl. B32b 21/08; C23b 5/60; C08g 45/06
U.S. Cl. 161—88                                   34 Claims

ABSTRACT OF THE DISCLOSURE

This invention is directed to a method and means for laminating superimposed layers or plies of the same or different material, e.g., wood, fabric, glass, brick, elastomer, leather, paper, plastic or metal, by adhering said layers with a curable liquid adhesive composition comprising a polyene and a polythiol which, on exposure to ionizing radiation or other free radical generating agent, cures to a solid adhesive under ambient conditions thereby bonding the layers into a laminated product. The adhesive system is especially useful in bonding plywood and veneered wood.

---

This application is a continuation-in-part of U.S. application Ser. No. 617,801, filed Feb. 23, 1967, now abandoned.

This invention relates to bonding laminated products, e.g. plywood, veneered wood, fabric, glass, brick, elastomer, leather, paper, plastic and metal with a curable liquid adhesive composition comprising a polyene and a polythiol which, on exposure to ionizing radiation or other free radical generating agent cures to a solid adhesive under ambient conditions thus bonding the laminated substrates.

In the plywood field today the prevalent method of forming plywood is to take plies cut to the desired size and shape and having a specified water content, apply an adhesive over the width of the crossband plies on both of the sides thereof, superimpose the face, crossband and core pieces in register and thereafter cure the adhesive under high pressure at elevated temperatures in a platen press to bond the plies together. The plywood is then cut to its desired dimensions and sanded for appearance. The system has several drawbacks. For example, one drawback in producing plywood is the time required to cure the adhesive at the elevated temperatures and pressures. Curing periods of 10 to 15 minutes or more are necessary for most of the present day commercial adhesives. Thus, the curing operation in the platen press is one of the main steps that determines the output of the plant. Another drawback of the present plywood process is that the plies must be dried to low moisture contents prior to adhesive application. This step is not only costly but may also be the limiting factor in the plant's productivity. If the plies are not sufficiently dry, the moisture will volatilize to steam during the heat curing, thereby causing the cured panel to delaminate when the press is opened. By allowing an ambient temperature cure, the moisture content of the wood is not critical and the plies need not be dried to such a low moisture content. Additionally, present adhesives whether they are admixed with volatile solvents or not, may generate byproducts from the adhesive during the curing step thereby causing an odor and possibly a skin irritation problem to employees in the plant. A further drawback is that at the high temperatures required to obtain a commercially acceptable rate of cure, it is possible that warpage or cupping of the plywood resulting from moisture loss can occur in addition to other dimensional changes caused by the high heat and pressure. A still further drawback to the present adhesive used in the plywood field is the relatively short pot life. That is, the adhesive must be used within a certain limited time period or it will cure on its own even at room temperatures thereby causing waste.

One object of the instant invention is to produce an adhesive composition for bonding a laminated product, which does not require elevated temperatures, prolonged dwell times or high pressures to effect curing.

Another object of this invention is to furnish a superior adhesive system which can be cured by energetic radiation (electromagnetic or ionizing) very efficiently and economically in the presence of oxygen (or air) under ambient conditions. Thus, much lower dose rates and shorter exposure times in the curing cycle are available than were previously possible in the prior art.

Yet another object of this invention is to provide an adhesive system for bonding of laminated products which does not require a solvent and which does not generate volatile by-products during the course of the curing reaction.

Another object of the instant invention is to provide an adhesive composition which has an extensive pot life and in which the cure in the preferred composition is not dependent upon admixture with other materials. These and other objects will become apparent from a reading hereinafter.

Summarily, the above and other objects are obtained by forming a liquid curable adhesive composition comprising a polyene, containing at least two reactive unsaturated carbon to carbon bonds per molecule and a polythiol containing at least two thiol groups per molecule, the total combined functionality of (a) the reactive unsaturated carbon to carbon bonds per molecule in the polyene, and (b) the thiol groups per molecule in the polythiol being greater than 4, applying said adhesive composition to at least one surface of one of the substrates to be laminated maintaining the substrates to be laminated in the desired number with the adhesive composition therebetween under at least contact pressure and, subjecting the substrates to be laminated to a free radical generator, preferably ionizing radiation to cure said adhesive.

The adhesive composition can be applied to any of the plies i.e. face, crossband, or core plies but in conformance with present day plywood practice, it is usually applied only to the crossband plies or to the core ply if no crossband plies are employed. The adhesive composition is generally applied by conventional glue spreaders presently employed in the trade.

The figure discloses diagrammatically one suitable apparatus for practicing the curing process for bonding plywood. The reference numeral 10 indicates crossband ply wood on a conveyer belt 11. The crossband plies are fed to and through a glue spreader 12 which applies the curable liquid adhesive composition of the polyene and the polythiol to both sides of the ply. The thus coated crossband plies are fed through the spreader onto a conveyer belt 13. Thereat the adhesive coated crossband plies are manually superimposed between face and core plies to form a sandwich 14 of the desired number of plies. Ordinarily the face and core plies are not coated with the adhesive and thus are placed on the conveyer belt 13 manually. For example, in a 5 ply piece of plywood there would be two outside face plies, a core ply in the center and two crossband plies between the face plies and the core ply. In the event of only forming a three ply piece of plywood then only the center ply i.e. the core ply, would be coated on both its sides with the adhesive composition. The sandwich of the plies is then passed through converging conveyer belts 15 to apply pressure on the plies and thus uniformly distribute the adhesive composition. The sandwich is then passed under a set of rollers 16 to maintain it under pressure and on through another set of rollers 17 on the other side of the electron beam generator 18. While the sandwich is passing under the generator it is subjected to high energy particle irradiation or gamma rays or X-rays penetratable to the entire depth of the sandwich. Such irradiation causes curing of the polyene-polythiol adhesive composition almost instantaneously i.e. 0.1 to 5 seconds. This operation is carried out under ambient conditions. To insure protection of the workers the irradiation is carried out in a shielded area 19. The bonded plywood is then passed to conveyor belt 20 where it is prepared for trimming and subsequent sanding by conventional means.

The adhesive bonding method of the instant invention can be used for flat or curved plywood bonding. For curved plywood bonding, the plies would merely be put on a mold and subjected to irradiation in the same manner as set out hereinbefore under ambient conditions.

The polythiols and one group of operable polyenes which can be cured rapidly as an adhesive by the practice of the instant invention are set out in a copending application assigned to the same assignee having Ser. No. 617,801 filed Feb. 23, 1967 and are incorporated herein by reference. That is, one group of polyenes operable in the instant invention are those having a molecular weight in the range 50 to 20,000, a viscosity ranging from 0 to 20 million centipoises at 70° C. of the general formula: [A]—(X)$_m$ wherein X is a member of the group consisting of

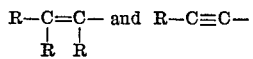

$m$ is at least 2; R is independently selected from the group consisting of hydrogen, halogen, aryl, substituted aryl, cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjunction with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

Examples of said operable polyenes include, but are not limited to (1) Crotyl-terminated polyurethanes which contain two "reactive" double bonds per average molecule in a near terminal position of the average general formula:

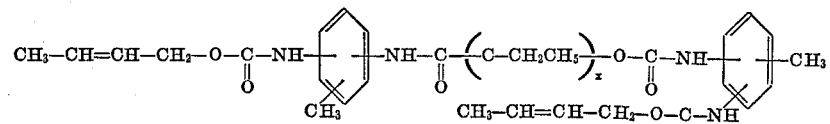

wherein $x$ is at least 1.

(2) Ethylene/propylene/non-conjugated diene terpolymers, such as "Nordel 1040" manufactured by Du Pont which contains pendant "reactive" double bonds of the formula:

(3) The following structure which contains terminal "reactive" double bonds:

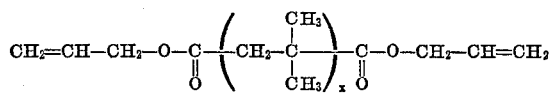

where $x$ is at least 1, (4) The following structure which contains near terminal "reactive" double bonds

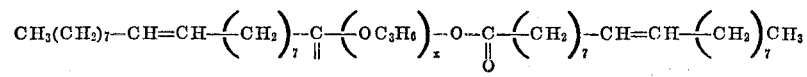

where $x$ is at least 1.

As used herein polyenes and polyynes refer to simple or complex species of alkenes or alkynes having a multiplicity of pendant, terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this is monovinylacetylene, which is a polyeneyne under our definition. For purposes of brevity all these classes of compounds will be referred to hereafter as polyenes.

A second group of polyenes operable in the instant invention includes unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber, and the like; unsaturated polyesters, polyamides, and polyurethanes derived from monomers containing "reactive" unsaturation, e.g., adipic acid-butenediol, 1,6-hexanediaminefumaric acid and 2,4-tolylene diisocyanate-butanediol condensation polymers and the like.

A third group of polyenes operable as part of the adhesive composition in this invention includes those polyenes in which the reactive unsaturated carbon to carbon bonds are conjugated with adjacent unsaturated groupings. Examples of operable reactive conjugated ene systems include, but are not limited to the following:

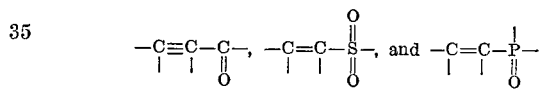

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1175, the triacrylate of the reaction product of trimethylolpropane with 20 moles of ethylene oxide, and the like.

Another group of polyenes operable as part of the adhesive compositions having an -ene or -yne functionality of at least two are formed by reacting either (a) An organic epoxide containing at least two

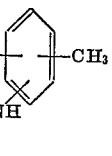

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or (b) An organic epoxide containing at least one organic substituent containing a reactive ethylenically or ethynylically unsaturated group with a member of the group consisting of hydrazine and an organic material containing at least two active hydrogen functions from the group consisting of

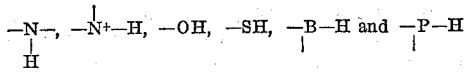

As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near-terminally in a branch of the main chain as contrasted to a position at or near the ends of the main chain. For purposes of brevity all of these positions will be referred to generally as "terminal" unsaturation.

The liquid polyenes operable in the first group of polyenes described above in the instant invention contain one or more of the following types of non-aromatic and non-conjugated "reactive" carbon to carbon unsaturation:

(1) $-CH=CH-$     (5) $-C=C-$
(2) $-CH\equiv C-$     (6) $-C=CH-$
(3) $-CH=CH_2$     (7) $-CH=C-$
(4) $-C\equiv CH$     (8) $-C=CH_2$ These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as:

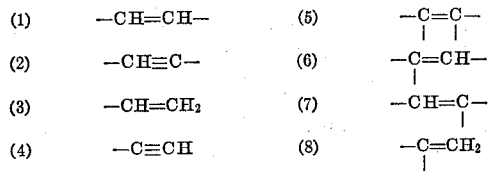

and the like so as to form a conjugated system of unsaturated bonds exemplified by the following structure:

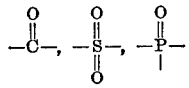

etc. On the average, the polyenes must contain 2 or more "reactive" unsaturated carbon to carbon bonds/molecule and have a viscosity in the range from 0 to 20 million centipoises at 70° C. Included in the term "polyenes" as used herein are those materials which in the presence of an inert solvent, aqueous dispersion or plasticizer fall within the viscosity range set out above at 70° C. Operable polyenes in the instant invention have molecular weights in the range 50–20,000, preferably 500 to 10,000.

As used herein the term "reactive" unsaturated carbon to carbon groups means groups having the structures as shown in 1–8 supra which will react under proper conditions as set forth herein with thiol groups to yield the thioether linkage

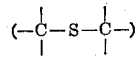

as contrasted to the term "unreactive" carbon to carbon unsaturation which means

groups when found in aromatic nuclei (cyclic structures exemplified by benzene, pyridine, anthracene, and the like) which do not under the same conditions react with thiols to give thioether linkages. In the instant invention, adhesive products from the reaction of polyenes with polythiols which contain 2 or more thiol groups per average molecule are called polythioether polymers or polythioethers.

As used herein, the term polythiols refers to simple or complex organic compounds having a multiplicity of pendant or terminally positioned —SH functional groups per average molecule.

On the average the polythiols must contain 2 or more —SH groups/molecule. They usually have a viscosity range of 0 to 20 million centipoises (cps.) at 70° C. as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range 50–20,000, preferably 100–10,000.

The polythiols operable in the instant invention can be exemplified by the general formula: $R_8$—$(SH)_n$ where $n$ is at least 2 and $R_8$ is a polyvalent organic moiety free reactive carbon to carbon unsaturation. Thus $R_8$ may contain cyclic groupings and minor amounts of hetero atoms such as N, S, P or O but primarily contains carbon-hydrogen, carbon-oxygen, of silicon-oxygen containing chain linkages free of any reactive carbon to carbon unsaturation.

One class of polythiols operable with polyenes in the instant invention to obtain a polythioether adhesive are esters of thiol-containing acids of the general formula: HS—$R_9$—COOH where $R_9$ is an organic moiety containing no "reactive" carbon to carbon unsaturation with polyhydroxy compounds of the general structure: $R_{10}$—$(OH)_n$ where $R_{10}$ is an organic moiety containing no "reactive" carbon to carbon unsaturation and $n$ is 2 or greater. These components will react under suitable conditions to give a polythiol having the general structure:

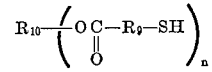

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol, tolylene-2,4-dithiol, etc.) and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include, but are not limited to, esters of thioglycolic acid (HS—$CH_2$COOH, α-mercaptopropionic acid (HS—CH($CH_3$)—COOH and β-mercaptopropionic acid (HS—$CH_2CH_2$COOH) with polyhydroxy compounds such as glycols, triols, tetraols pentaols, hexaols, etc. Specific examples of the preferred polythiols include, but are not limited to, ethylene glycol bis (thioglycolate), ethylene glycol bis (β-mercaptopropionate), trimethylolpropane tris (thioglycolate), trimethylolpropane tris (β - mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene ether glycol (e.g., Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and useful adhesives for both indoor and exterior applications.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality (f) of three. A polymeric dithiol is a polythiol with an average of two thiol groups per molecule and thus has a functionality (f) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If however the reaction were carried to only 90% of theory for complete reaction, about 10% of the molecules present would have only one ene functional group, and there may be a trace of materials that would have no ene functional groups at all. Approximately 90% of the molecules, however, would have the desired diene structure and the product as a whole then would have an actual functionality of 1.9. Such a product is useful as an adhesive in the instant invention and is referred to herein as having a functionality of 2.

The aforesaid polyenes and polythiols, can if desired, be formed or generated in situ and still be rapidly cured by the process of the instant invention.

To obtain the maximum strength, solvent resistance, creep resistance, heat resistance and freedom from tackiness, the reactive adhesive components consisting of the polyenes and polythiols of this invention are formulated in such a manner as to give solid, crosslinked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The adhesive compositions to be cured, i.e. (converted to solid resins or elastomers) in accord with the present invention may, if desired, include such additives an antioxidants, accelerators, dyes, inhibitors, activators, fillers, pigments, anti-static agents, flame-retardant agent, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts of the polyene-polythiol adhesive compositions by weight and preferably 0.005–300 parts on the same basis.

In all the curable adhesive systems herein, the compositions consist of 2 to 98 parts by weight of a polyene containing at least 2 reactive unsaturated carbon to carbon bonds per molecule and 98 to 2 parts by weight of a polythiol containing at least 2 thiol groups per molecule. If a chemical free-radical generating agent is used, it is present in an amount ranging from 0.01 to 10.0 parts by weight of the polyene-polythiol adhesive composition.

The polyene-polythiol adhesive composition of the instant invention can be cured by ionizing irradiation. A preferred feature of the ionizing irradiation operation of the instant invention is treatment with high energy particle irradiation or by gamma-rays or X-rays. Irradiation employing particles in the instant invention includes the use of positive ions, (e.g., protons, alpha particles and deuterons), electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchrotron or the like. Furthermore, particle irradiation may also be supplied from radioactive isotopes or an atomic pile. Gamma rays or X-rays may be obtained from radioisotopes (e.g., cobalt 60) or by particle bombardment of suitable target material (e.g., high energy electrons on a gold metal target).

The dose rate for the irradiation operable to cure the adhesive in the instant invention is in the range 0.00001 to 25 megarads/second.

The amount of ionizing radiation which is employed in curing the polymeric adhesive material in the instant invention can vary between broad limits. Radiation dosages of less than a megarad up to 10 megarads or more for electrons are operable, preferably 0.02 to 5 megarads energy absorbed are employed. For gamma-rays or X-rays, radiation dosages in the range 0.0001 to 5.0 megarads energy absorbed are operable. The irradiation step is ordinarily performed under ambient temperature conditions but can be performed at temperatures ranging from below room temperature up to temperatures above which the substrates start to degrade.

When using ionizing radiation, the depth of penetration is dependent upon the density of the material to be penetrated. When the ionizing irradiation is in the form of electrons, 0.2 to 12 million electron volts (mev.) are usually employed. Where gamma-rays or X-rays are employed, a range of 0.01 to 5.0 million electron volts is used. The aforesaid range of voltage will allow penetration of aluminum in the range of 1–1200 mils, of titanium in the range of 1–800 mils, of plastics in the range of 1–4000 mils or more and of wood, fabrics and paper in the range of 2–8000 mils. As aforestated if such penetration is not sufficient to cure the adhesive to the entire depth desired when beaming the radiation from one direction only, one may use multiple radiation sources beaming simultaneously or intermittently from diametrically opposite sides of the laminated structure to be adhered. If bonded thicknesses even greater than this are desired, one can adhere two or more irradiation-bonded sandwiches together using a chemical free radical generating agent which is not dependent on radiation energy to activate the polyene-polythiol adhesive as will be shown in an example hereinafter.

The adhesive is usually applied to the substrate layers in thicknesses ranging from 0.05 to 15 mils, preferably about 0.1 to 10 mils.

The curing reaction between the polyene and the polythiol can also be initiated by any other free radical mechanism which dissociates or abstracts the hydrogen atom from the SH group (or accomplishes the equivalent thereof) and which is operable under ambient conditions. Thus, it is possible to merely expose the polyene and polythiol admixture to ambient conditions (oxygen from the air is the initiator) and obtain a cured solid adhesive product. Azo compounds or peroxides (with or without amine accelerators) which decompose at ambient conditions are also operable as free radical generating agents capable of curing the polyene-polythiol components of the instant invention to solid adhesive products.

The source of free radicals can be various well known free radical generating agents such as organic peroxides, azo compounds, carbazates as taught in a copending application having Ser. No. 618,345 filed Feb. 24, 1968, now U.S. Pat. No. 3,513,125, and assigned to the same assignee, metal salts capable of redox reactions, dioximes, diesters of dioximes and the like. Examples of operable organic peroxides include, but are not limited to, benzoyl peroxide; dicumyl peroxide; 2,5-dimethyl-2,5-di-(t-butylperoxy)hexane; 2,5-dimethyl-2,5 - di(t-butylperoxyl)hexyne-3 and ditertiary bisperoxides of the general formula:

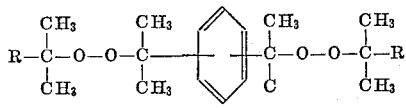

wherein R is a member of the group consisting of methyl and phenyl. Operable azo compounds include, but are not limited to 2-phenylazo-2,4,4-trimethylvaleramide; 2-phenylazoisobutyramide; 2-phenylazo-2,4,4-trimethylvaleronitrile, etc.

Various operable carbazates include, but are not limited to, methyl carbazate, ethyl carbazate, te-butyl carbazate, phenyl carbazate, myristyl carbazate, and the like. When bonding UV transparent layers, UV light with or without chemical photoinitiators or sensitizers (photocuring rate accelerators) such as benzophenone, acetophenone, dibenzosuberone, methyl ethyl ketone, etc.) yields rapid cures by the practice of the instant invention. One instance where chemical free radical generating agents are employed in the instant invention instead of ionizing radiation is in the case when the ionizing radiation is insufficient to effect curing of the adhesive throughout the entire desired depth. In this instance, it is possible to cure the polyene and polythiol adhesive to the known penetration depth of the ionizing radiation and thereafter superimpose stacks of the material cured by ionizing radiation upon one another, insert a polyene-polythiol adhesive therebetween and cured the inserted adhesive by the use of a chemical free radical generating agent. The thus cured stacks in the case of plywood can then be cut to the desired dimensions and standed for appearance by conventional means.

The adhesive may be a single component, i.e. the admixed polyene-polythiol; or a multi component, i.e. mix the polyene and the polythiol and apply on the site. It is preferred to use the single component system due to its ease of usage.

The curing mechanisms for the single component system are ionizing radiation, e.g. an electron beam which is preferred, or ultraviolet light plus a photocuring rate accelerator when the layers are UV transparent, and heat, for the multi component system it is possible to use free radical generating agents such as benzoyl peroxide plus a tertiary amine; benzilic acid; oxime esters plus an iron containing material e.g. iron salt as disclosed in a copending application having Ser. No. 805,354, filed Mar. 7, 1969, assigned to the same assignee and incorporated herein by reference. Other well known chemical free radical generating agents are also operable.

The adhesive can be applied by various means. For example, the adhesive can be applied by conventional glue spreaders; extrusion; printing, spraying, brushing, and the like. The polyene-polythiol adhesive can also be used in the form of take, ribbon or sheet by impregnating or coating the polyene-polythiol composition on a woven or non-woven fabric as a support.

The layers which can be adhered and formed into laminated products by the process of the instant invention can be of various materials.

The term "laminated product(s)" is used herein in a generic sense to denote a product made up of two or more relatively thin layers or plies of material bonded together with an adhesive material. Broadly, all the plies can be of the same material or of two or more different materials such as plastic films or sheets (e.g. polyvinyl chloride, polycarbonates, polyfluoroethylene, polyolefins, polymethacrylates, etc.) metal sheets, cloth, glass, elastomers, wood plies, veneers, particle boards, porcelain, hardboards, fabric and leather.

The examples herein are particularly directed to laminated wood products. A "laminated wood product" is a "laminated product" wherein at least one ply is wood. Thus within the scope of the term are contemplated plywoods and veneered wood which consists of a cheaper wood core having bonded to one or both surfaces a veneer of a harder, more expensive wood such as oak, mahogany, hard maple, and cherry.

The adhesive composition can be in many forms. That is, the composition can be 100% solids, i.e., without solvents present which is preferred; in liquid, wax, or solid state or thixotropic paste; solutions or dispersions in organic solvents or plasticizers; dispersions, emulsions or solutions in water.

The following examples will aid in explaining but should not be deemed as limiting the instant invention. In all cases unless otherwise noted all parts and percentages are by weight.

PREPARATION OF POLYENES

Example 1

1 mole diglycidyl ether of bisphenol A having a molecular weight in the range 370–384 and commercially available from Shell Chemical Company under the trade name "Epon 828" and 2 moles of allyl amine were dissolved in 500 ml. benzene in a beaker at room temperature (25° C.). The reaction was continued for 18 hours during which time the exotherm and reaction temperature was maintained below 80° C. The benzene solvent was removed by vacuum. The thus formed allyl terminated liquid prepolymer will hereinafter be referred to as Prepolymer A.

Example 2

Example 1 was repeated except htat 2 moles of diallyl amine was substituted for the 2 moles of allyl amine and no benzene solvent was used. The thus formed allyl terminated liquid prepolymer will hereinafter be referred to as Prepolymer B.

Example 3

1 mole of a commercially available liquid polymeric diisocyanate sold under the trade name "Adiprene L 100" by E. I. du Pont de Nemours & Co., was charged to a resin kettle equipped with a condenser, stirrer, thermometer and a gas inlet and outlet along with 4 grams of dibutyl tin dilaurate as a catalyst. 2 moles of allyl alcohol was slowly added to the kettle during which time the exotherm and reaction temperature was maintained below 80° C. After the addition of the allyl alcohol was completed the reaction was continued for 15 hours at 70° C. under nitrogen. The thus formed allyl terminated liquid prepolymer will hereinafter be referred to as Prepolymer C.

Example 4

1 mole of commercially available tolylene diisocyanate was charged to resin kettle equipped with a condenser, stirrer, thermometer, and gas inlet and outlet. 2 moles of the diallyl ether of trimethylpropane was slowly added to the kettle. After the addition was complete, 4.0 grams of dibutyl tin dilaurate as a catalyst was added to the kettle and the reaction was continued for 30 minutes at 70° C. under nitrogen. The thus formed allyl terminated liquid prepolymer will hereinafter be referred to as Prepolymer D.

Example 5

An admixture of Prepolymer A from Example 1 herein and pentaerythritol tetrakis (β-mercaptopropionate), a commercially available polythiol from Carlisle Chemical Company sold under the trade name "Q–43," said Prepolymer A polyene: polythiol mole ratio being 1:0.5 respectively was coated on both surfaces of a 7/32 inch core ply of plywood dried to a moisture content of 9–10%. The glue spread was 30 pounds per 1000 square feet of single glue line (MSGL). 3/32 inch plys of face plywood of the same moisture content were pressed against the coated surfaces of the core ply and held in contact therewith with C clamps. The thus formed laminated sandwich was passed under the beam of a two million electron volt (mev.) Van de Graaff electron accelerator at a pass rate of 44 feet per minute to cure the adhesive. The accelerator was maintained at a beam current of 2.5 milliamperes while the stack was passed under its 12 inch scan window at a distance of 10 inches therefrom. The thus formed plywood was released from the C clamps and cut into 1 inch strips. Attempts were made to separate the layers in four of the strips. In every case, the wood ruptured showing thta the bond formed by the curable liquid polymer adhesive was stronger than the wood. Four of the bonded strips were immersed in boiling water. After 8 hours, no separation of the bond occurred showing that the bond has adequate water resistance for exterior grade plywood.

It should be noted that should the face ply be made up of more than one piece, thus requiring edge glueing, the edge glueing step can be performed simultaneously with the bonding of the various plies when it passes under the irradiation beam.

Example 6

1 mole of Prepolymer B from Example 2 was admixed with 1 mole of "Q-43," i.e. pentaerythritol tetrakis ($\beta$-mercaptopropionate) and the resulting liquid was applied in an amout equal to 20 pounds per 1000 square feet of single glue line with a paint brush to two pieces of 10" x 4" of 1/4 inch plywood. These were joined so that the adhesive composition was in the center. The corners of the plywood were nailed to hold the laminate together until it could be cured. The laminate was exposed to 1 megarad of radiation from a Van de Graaff electron accelerator. The nails were removed from the thus cured laminate. The laminate was cut into 1 inch strips and attempts were made to separate the layers. In every case, the wood itself ruptured or partial failure occurred at an original glue line in the plywood, thus showing that the bond formed by the curable liquid polymer adhesive of the instant invention was stronger than the wood or the old glue. The experiment was repeated using 2, 4, and 8 megarads of irradiation with the same results. The bonded 1 inch strips described above were immersed in boiling water. After 8 hours, no separation of the bond occurred, thus showing adequate water resistance for an exterior grade plywood.

Example 7

Example 6 was repeated except that 3 moles of Prepolymer C from Example 3 were substituted for the 1 mole of Prepolymer B from Example 2 and 2 moles of trimethylolpropane tris ($\beta$-mercaptopropionate) were substituted for the 1 mole of pentaerythritol tetrakis ($\beta$-mercaptopropionate). The bonding results were substantially the same.

Example 8

Example 6 was repeated except that 1 mole of Prepolymer D from Example 4 was substituted for the 1 mole of Prepolymer B from Example 2. The bonding results were substantially the same. However, in this case, dose rates of 0.5 and 0.25 megarad were also used successfully in the bonding operation.

Example 9

Using the equipment shown in the figure, a 3/4 inch exterior, 5 ply piece of plywood 48" x 96" was made as follows.

Crossband pieces 101" x 54" x 3/16" were fed on the ply feeder conveyor belt through the glue spreader whereat a glue spread of 30 pounds per 100 square feet of single glue line of an admixture of Prepolymer B from Example 2 and pentaerythritol tetrakis ($\beta$-mercaptopropionate) sold under the trade name "Q-43" by Carlisle Chemical Company, in a 1:1 ratio respectively was applied to each side of each of the two crossband pieces (3/16 inch) fed therethrough. A 1/16 inch thick face piece was placed manually on the conveyor belt at the lay up station on top of which one of the crossband plies was positioned. On top of this was laid up a 1/4 inch core ply followed by another 3/16" adhesive coated crossband ply from the ply feed. The sandwich was capped off by another 1/16 inch face ply being manually positioned over the crossband ply to make up the 5 ply sandwich, all plies having been dried to a moisture content of 9-10%. The sandwich was passed through converging conveyor belts to apply pressure on the plies and thus uniformly distribute the adhesive composition thereover. Thereafter the sandwich was passed through a set of rollers to maintain it under pressure and on through another set of rollers to uniformly maintain pressure on all plies. While passing between the two sets of rollers, the thus compressed plies with the adhesive composition therebetween was irradiated with a 3 mev. Dynamitron electron accelerator commercially available from Radiation Dynamics, Inc. having a beam current of 10 milliamperes and a 4 foot scan at a 0.05 megarad dose while the plies were passing under the scan at a rate of 62 feet/minute. The thus formed plywood was trimmed to a 4' x 8' piece of plywood by conventional means and on subjection to separation showed rupture within the plies and not at the glue line. Samples of the cured plywood were immersed in boiling water and after 8 hours, no separation of the adhesive bond occurred.

Example 10

To obtain 1½" thick plywood, one of two 4" x 4" x 3/4" samples of the cured plywood of Example 9 was coated with an adhesive composition comprising a mixture of 100 parts of Prepolymer A from Example 1, 85 parts by pentaerythritol tetrakis ($\beta$-mercaptopropionate), 1 part benzoyl peroxide and 2 parts of dimethylaniline using a glue spread of 40 pounds per 1000 square feet of glue line and immediately held under pressure against the other polywood sample with the adhesive composition therebetween. Within 5 minutes the adhesive composition between the plywood samples cured to the extent that on attempted separation, rupture occurred in the wood. Samples of the cured plywood were immersed in boiling water. After 8 hours no separation of the bond occurred.

Example 11

Example 10 was repeated except that the adhesive composition in a glue spread of 25 pounds per 1000 square feet of single glue line, consisted essentially of 30 g. of Prepolymer A from Example 1, 18 g. of pentaerythritol tetrakis ($\beta$-mercaptopropionate), 3 milligrams of ferric acetylacetonate and 0.15 g. of cyclohexanone oxime benzoate. Within 5 minutes the adhesive cured to the extent that on an attempted separation, rupture occurred in the wood. Samples of the cured plywood were immersed in boiling water. After 8 hours, no separation of the adhesive bond occurred.

Example 12

To obtain 1¼" thick plywood, 10 pieces of 101" x 54" x 1/8" plies dried to a moisture content of 8% were coated with an adhesive composition in a glue spread of 20 pounds per 1000 square feet of single glue line, consisting of an admixture of Prepolymer B from Example 2 and pentaerythritol tetrakis ($\beta$-mercaptopropionate) in a mole ratio of 1:1 respectively. The adhesive-coated plies were sandwiched together under pressure and passed between two General Electric resonant transformers (2 mev. electrons) horizontally mounted at a beam current of 2.5 milliamperes at a pass rate of 11 feet/minute using a scan width of 4 feet. The cured plywood was trimmed to 4' x 8" dimensions by conventional means. Attempts to separate the cured plywood resulted in rupture of the wood and not at the glue line.

Samples of the cured plywood were immersed in boiling water. No separation of the bond occurred.

Example 13

Example 6 was repeated except that 2 moles of diallyl maleate (commercially available from Distillation Products Industries, Div. Eastman Kodak Co.) was substituted for the 1 mole of Prepolymer B from Example 2. The bonding results were substantially the same.

Example 14

Example 6 was repeated except that 2 moles of polyethylene glycol dimethacrylate was substituted for the 1 mole of Prepolymer B from Example 2. The bonding results were substantially the same.

Example 15

Example 6 was repeated except that 1.33 moles of 1,2,4-trivinylcyclohexene (from Aldrich Chemical Company) was substituted for the 1 mole of Prepolymer B from Example 2. The bonding results were substantially the same.

Example 16

Example 6 was repeated except that 1.33 moles of diallyl allyl phosphonate (from Aldrich Chemical Company) was substituted for the 1 mole of Prepolymer B from Example 2. The bonding results were substantially the same. In this case the bonding was successful also at dosages of 0.2 and 0.5 megarad.

Example 17

Example 6 was repeated except that 2 moles of dimethallyl maleate (from Borden Chemical Co.) was substituted for the 1 mole of Prepolymer B from Example 2. The bonding results were substantially the same.

The adhesive composition of the instant invention is present in the plywood in an amount in the range 10 to 100 pounds per 1000 sq. ft. of glue line, preferably 10–60 pounds per 1000 sq. ft. of glue line.

The moisture content of the plies while being bonded by the practice of the instant invention can range between relatively wide limits due to the fact that elevated temperatures are not necessary for curing. Thus the plies can have a moisture content ranging from 0 up to 12 percent or more without causing warping or delamination on curing.

The amount of pressure under which the plies are maintained while being cured is that sufficient to maintain the plies in contact while the curing is being performed. Pressure ranging from 0.1 to 500 p.s.i., preferably 50 to 150 p.s.i., are operable in carrying out the instant invention It is also possible by the use of the present invention to bond wood grain printed vinyl veneer to hardboard, wallboard and chipboard. Such bonded materials can be used as residential home paneling, kitchen cabinets, furniture, store fixtures, door skins, TV and stereo cabinets and partitions. The following example shows the use of the instant invention in forming a wood grain printed vinyl film on a hardboard for residential interior paneling.

Example 18

A 4′ x 8′ x ¼″ tempered hardboard, commercially available from Masonite Corporation, Chicago, Ill., was coated on one surface with an adhesive composition comprising Prepolymer B from Example 2 and pentaerythritol tetrakis (β-mercaptopropionate), said adhesive ingredient being in 1:1 mole ratio using a glue spread of 20 pounds per 1000 sq. ft. of glue line. A piece of wood grained printed vinyl film 4′ x 8′ x 6 mil, commercially available from Elm Coated Fabrics Company, Brooklyn, N.Y., was placed on top of the adhesive composition on the hardboard and the thus laminated structure was passed through a first set of nip rolls to maintain the vinyl in contact with the hardboard and then on through another set of nip rolls. While passing through the two sets of nip rolls it was passed under the beam of a 300 kev. Dynacote electron accelerator from Radiation Dynamics at pass rate of 320 feet per minute to cure the adhesive. The accelerator was maintained at a beam current of 50 milliamperes while the laminated material was passed under its 4′ scan window at a distance of 3 inches therefrom. The resultant cured wood grained printed vinyl film on the hardboard was used as a panel in a household recreation room.

The example was repeated using ¼″ wallboard commercially available from U.S. Gypsum Co., Chicago, Ill., and also using chipboard as a backing material for the vinyl film. The results were substantially the same. It should be understood that any vinyl film not necessarily printed wood grained vinyl film is operable in the instant invention. Thus solid color vinyl film can also be laminated to hardboard, chipboard or wallboard by the process of the instant invention.

The following examples shows the versatility of the instant invention in laminating various substrates together.

Example 19

A laminated sandwich was made up comprising a 5 mil thick piece of bond paper, a 10 mil thick piece of aluminum foil, a ⅛ inch piece of glass, a 1/32 inch thick piece of steel, and a cinder block from top to bottom respectively. Each layer in the sandwich was coated with an adhesive composition comprising Prepolymer B from Example 2 and pentaerythritol tetrakis (β-mercaptopropionate) in a 1:1 mole ratio respectively using a glue spread of 20 pounds per 1000 sq. ft. of glue line. The laminated layers were clamped together under pressure and irradiated with a 3 mev. Dynamitron Electron Accelerator commercially available from Radiation Dynamics, Inc. having a beam current of 5 milliamperes and a 10 inch. scan at a 1.0 megarad dose. In no case did the laminate separate at the glue line.

The following examples show the use of the instant invention in bonding fabrics.

Example 20

Two 6 x 6 white cotton broadcloth swatches (4 oz. fabric) were bonded together using an adhesive composition consisting of Prepolymer A from Example 1 and pentaerythritol tetrakis (β-mercaptopropionate) in a mole ratio of 2:1 respectively using a glue spread of 10 pounds per 1000 sq. ft. of glue line. The swatches were contacted together and were passed under the beam of a 300 kev. Dynacote electron accelerator at a pass rate of 320 ft. per minute to cure the adhesive. The accelerator was maintained at a beam current of 50 milliamperes while the laminated material was passed under its 48″ scan window at a distance of 3 inches therefrom. An attempt to separate the thus cured swatches resulted in rents in the cotton. The example was repeated using nylon taffeta (3 oz. weight). The results were substantially the same.

The example was repeated using a 3 oz. polyester sold under the trade name "Permaprest" by Sears Roebuck and Co. The results were substantially the same.

The adhesive composition of the instant invention is also operable for bonding natural and synthetic leathers and natural and synthetic elastomers such as used for shoe uppers and soles of shoes. That is, both natural and synthetic leather uppers e.g. "Corfam" shoe uppers can be bonded to leather soles. Additionally, it is also possible to bond the heels of shoes to soles by use of the adhesive composition of the instant invention. The following examples show the bonding of leather to leather and leather to elastomers i.e. natural and synthetic rubbers which could be used for example in the shoe and clothing industry.

Example 21

Two 4" x 4" pieces of leather (one 65 mil thick and one 3/8" thick) were bonded together using an adhesive composition consisting of Prepolymer B from Example 2 and pentaerythritol tetrakis (β-mercaptopropionate) in a mole ratio of 1:1 respectively using a glue spread of 10 pounds per 1000 sq. ft. of glue line. The leather pieces were contacted together with the adhesive composition therebetween and passed under the beam of a 2 mev. General Electric resonant transformer at a pass rate of 10 feet per minute to cure the adhesive. The accelerator was maintained at a beam current 3 milliampers while the leather material was passed under its 48" scan window at a distance of 10 inches therefrom. An attempt to separate the thus cured leather pieces resulted in tearing of the leather.

The example was repeated except that a 4" x 4" x 65 mil piece of a poromeric synthetic shoe upper material sold under the trade name "Corfam" by E. I. du Point de Nemours & Co. was substituted for the 65 mil thick piece of leather. An attempt to separate the thus cured leather-"Corfam" laminate resulted in a tear in the "Corfam"

Example 22

Two 4" x 4" x 3/8" pieces of NBR rubber (a copolymer of butadiene and acrylontrile containing 35 mole percent acrylonitrile) were bonded together using an adhesive composition consisting of Prepolymer B from Example 2 and pentaerythritol tetrakis (β-mercaptopropionate) in a mole ratio of 1:1 respectively using a glue spread of 10 pounds per 1000 sq. ft. of glue line. The rubber pieces were contacted together with the adhesive composition therebetween and passed under the beam of a 3 mev. Radiation Dynamics Dynamitron at a pass rate of 10 feet per minute to cure the adhesive. The acccelerator was maintained at a beam current of 5 milliamperes while the laminated material was passed under its 48" scan window at a distance of 10 inches therefrom. Attempts to separate the rubber pieces resulted in one of the rubber layers being destroyed.

It should be noted that the instant adhesive composition is operable in bonding various types of elastomers including both natural and synthetic rubbers.

Example 23

A 4 x 4 x 65 mil piece of leather having a density of 1.02 grams per cc. was bonded to a 4 x 4 x 3/8" piece of NBR rubber (a copolymer of butadiene and acrylonitrile containing 50 mil percent acrylonitrile) using an adhesive composition consisting of Prepolymer B for Example 2 and pentaerythritol tetrakis (β-mercaptopropionate) in a mole ratio of 1:1 respectively using a glue spread of 15 pounds per 1000 sq. ft. of glue line. The rubber and leather were contacted together with the adhesive therebetween and passed under the beam of a 2 mev. General Electric resonant transformer at a pass rate of 10 feet per minute to cure the adhesive. The accelerator was maintaine at a beam current of 3 milliamperes while the material to be laminated was passed under its 48" scan window at a distance of 10 inches therefrom. An attempt to separate the cured rubber-leather laminate resulted in tearing the leather.

The example was repeated excpt that a poromeric synthetic shoe upper material sold under the trade name "Corfam" by E. I. du Pont de Nemours & Co. was substituted for the leather. The results were substantially the same.

The adhesive composition of the instant invention can also be used to make safety glass.

Example 24

Two pieces of 6" x 6" x 1/8" ordinary plate glass were bonded together using an adhesive composition consisting of diallyl allyl phosphonate and pentaerythritol tetrakis (β)-mercaptopropionate) in a mole ratio of 1.33:1 respectively along with 0.2% by weight of the adhesive composition of dibenzosuberone as a curing rate accelerator. The adhesive composition was applied to the surface of one of the glass pieces to a thickness of 2 mils. The glass pieces were contacted together with the adhesive composition therebtween and exposed to UV radiation from a 275 watt sun lamp for 2 minutes to give a radiation intensity at the adhesive layer of 4000 microwatts/cm.$^2$. The thus cured safety glass was tested by striking with a hammer. Although the glass shattered into many pieces, the pieces adhered to the adhesive composition.

What is claimed is:

1. A process for bonding substrates which comprises:
   (1) applying to at least one of the surfaces of a substrate to be bonded an adhesive composition consisting essentially of 98 to 2 percent by weight of said composition of a polyene containing at least two reactive unsaturated carbon to carbon bonds per molecule, derived from a member of the group consisting of epoxy, amide, urethane, and ester containing precursor and 2 to 98 percent by weight of said composition of a polythiol containing at least two thiol groups per molecule, the total combined functionality of (a) the reactive unsaturated carbon to carbon bonds per molecule in the polyene and (b) the thiol groups per molecule in the polythiol being greater than 4,
   (2) contacting the adhesive-coated substrate with another substrate to be bonded thereto, and
   (3) subjecting the adhesive composition to the action of a free radical generator to cure the adhesive composition.

2. The process according to claim 1 wherein the polyene is formed by reacting either
   (A) an organic epoxide containing at least two

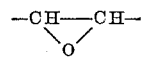

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or
   (B) an organic epoxide containing at least one organic substituent containing a reactive ethylenically or ethynylically unsaturated group with a member of the group consisting of hydrazine and an organic material containing at least two active hydrogen functions from the group consisting of

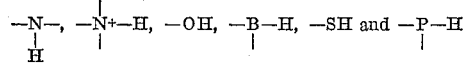

3. The process according to claim 2 wherein the polyene is the reaction product of 1 mole of diglycidyl ether of bisphenol A and 2 moles of allyl hydrazine.

4. The process according to claim 2 wherein the polyene is the reaction product of 1 mole of diglycidyl ether of bisphenol A and 2 moles of allyl amine.

5. The process according to claim 2 wherein the polyene is the reaction product of 1 mole of diglycidyl either of bisphenol A and 2 moles of diallyl amine.

6. The process according to claim 1 wherein the polyene is the reaction product of 1 mole of tolylene diisocyanate and 2 moles of the diallyl ether of trimethylolpropane.

7. The process according to claim 1 wherein the polyene is the reaction product of 1 mole of a polyether diisocyanate and 2 moles of allyl alcohol.

8. The process according to claim 1 wherein the polythiol is a member of the group consisting of pentaerythritol tetrakis (β-mercaptopropionate) and trimethylolpropane tris (β-mercaptopropionate).

9. The process according to claim 1 wherein the substrates to be bonded are individually selected from the group consisting of glass, wood, plastic, metal, fabric, paper, cinder block, elastomers and leather.

10. The process according to claim 1 wherein the free radical generator comprises ionizing radiation.

11. The process according to claim 1 wherein the free radical generator comprises a chemical free radical source.

12. The process according to claim 11 wherein the chemical free radical source is a member of the group consisting of an organic peroxide in combination with a tertiary amine; metal salts capable of redox reactions and oximes and oxime esters in combination with an iron containing compound.

13. The process according to claim 1 wherein at least one of the substrates is transparent and the free radical generator is UV light.

14. The process according to claim 13 wherein a photocuring rate accelerator is added to the adhesive composition.

15. The process according to claim 14 wherein the curing rate accelerator is a member of the group consisting of methyl ethyl ketone, benzophenone, acetophenone and dibenzosuberone.

16. An article of manufacture comprising substrates bonded with an adhesive composition consisting essentially of 98 to 2 percent by weight of said composition of a polyene containing at least two reactive unsaturated carbon to carbon bonds per molecule derived from a member of the group consisting of epoxy, amide, urethane, and ester containing precursor and 2 to 98 percent by weight of said composition of a polythiol containing at least two thiol groups per molecule, the total combined functionality of (a) the reactive unsaturated carbon to carbon bonds per molecule in the polyene and (b) the thiol groups per molecule in the polythiol being greater than 4, said composition having a thickness in the range 0.05 to 15 mils and being curable by a free radical generator.

17. The article of manufacture according to claim 16 wherein the substrates to be bonded are individually selected from the group consisting of glass, wood, plastic, metal fabric, paper, cinder block, elastomers and leather.

18. A method for producing plywood comprising:
(1) applying to the wood plies, an adhesive composition consisting essentially of 98 to 2 percent by weight of said composition of a polyene containing at least two reactive unsaturated carbon to carbon bonds per molecule derived from a member of the group consisting of epoxy, amide, urethane, and ester containing precursor and 2 to 98 percent by weight of said composition of a polythiol containing at least two thiol groups per molecule, the total combined functionality of (a) the reactive unsaturated carbon to carbon bonds per molecule in the polyene and (b) the thiol groups per molecule in the polythiol being greater than 4, said adhesive composition being applied in an amount in the range 10 to 100 pounds per 1000 sq. ft. of glue line,
(2) forming a plurality of said plies in register with the adhesive composition between said plies,
(3) and while maintaining said plies under a pressure of between about 0.1 p.s.i. and about 500 p.s.i. subjecting said plies to ionizing radiation at a dose rate in the range 0.00001 to 25 megarads/second to cure the adhesive.

19. The process according to claim 18 wherein the polyene is formed by reacting either
(A) an organic epoxide containing at least two

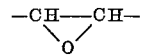

groups in its structure with a member of the group consisting of hydrazine, primary amines, secondary amines, tertiary amine salts, organic alcohols, and organic acids wherein said group members contain at least one organic substituent containing a reactive ethylenically or ethynylically unsaturated group, or
(B) an organic epoxide containing at least one organic substituent containing a reactive ethylenically or ethynylically unsaturated group with a member of the group consisting of hydrazine and an organic material containing at least two active hydrogen functions from the group consisting of

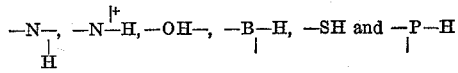

20. The process according to claim 19 wherein the polyene is the reaction product of 1 mole of diglycidyl ether of bisphenol A and 2 moles of allyl hydrazine.

21. The process according to claim 19 wherein the polyene is the reaction product of 1 mole of diglycidyl ether of bisphenol A and 2 moles of allyl amine.

22. The process according to claim 19 wherein the polyene is the reaction product of 1 mole of diglycidyl ether of bisphenol A and 2 moles of diallyl amine.

23. The process according to claim 18 wherein the polyene is the reaction product of 1 mole of tolyene diisocyanate and 2 moles of the diallyl ether of trimethylolpropane.

24. The process according to claim 18 wherein the polyene is the reaction product of 1 mole of polyether diisocyanate and 2 moles of allyl alcohol.

25. The process according to claim 18 wherein the polythiol is a member of the group consisting of pentaerythritol tetrakis (β-mercaptopropionate) and trimethylolpropane tris (β-mercaptopropionate).

26. A plywood having wood plies bonded with an adhesive composition consisting essentially of 98 to 2 percent by weight of said composition of a polyene containing at least two reactive unsaturated carbon to carbon bonds per molecule derived from a member of the group consisting of epoxy, amide, urethane, and ester containing precursor and 2 to 98 percent by weight of said composition of a polythiol containing at least two thiol groups per molecule, the total combined functionality of (a) the reactive unsaturated carbon to carbon bonds per molecule in the polyene and (b) the thiol groups per molecule in the polythiol being greater than 4, said composition being applied in an amount ranging from 10 to 100 pounds per 1000 sq. ft. of glue line and being cured by ionizing radiation.

27. A process for bonding substrates which comprises applying to at least one of the surfaces of a substrate to be bonded an adhesive composition consisting essentially of
(1) 98 to 2 percent by weight of said composition of a polyene containing at least two reactive unsaturated carbon to carbon bonds per molecule derived from a member of the group consisting of epoxy, amide, urethane, and ester containing precursor.
(2) 2 to 98 by weight of said composition of a polythiol containing at least 2 thiol groups per molecule, the total combined functionality of (a) the reactive unsaturated carbon to carbon bonds per molecule in the polyene and (b) the thiol groups per molecule in the polythiol being greater than four, and
(3) 0.01 to 10 parts by weight of the polyene-polythiol adhesive composition of a chemical free-radial generating agent.

28. The process according to claim 27 wherein the chemical free-radical generating agent is selected from the group consisting of an organic peroxide in combination with a tertiary amine; metal salts capable of redox reactions and oximes and oxime esters in combination with an iron containing compound.

29. The process according to claim 27 wherein the substrates to be bonded are individually selected from the group consisting of glass, wood, plastic, metal, fabric, paper, cinder block, elastomers and leather.

30. A method for laminating a veneer to a substrate comprising:
(1) applying to the substrate, an adhesive composition consisting essentially of 98 to 2 percent by weight of said composition of a polyene containing at least two reactive unsaturated carbon to carbon bonds per molecule derived from a member of the group consisting of epoxy, amide, urethane, and ester containing precursor and 2 to 98 percent by weight of said composition of a polythiol containing at least two thiol groups per molecule, the total combined functionality of (a) the reactive unsaturated carbon to carbon bonds per molecule in the polyene and (b) the thiol groups per molecule in the polythiol being greater than four, said adhesive composition having a thickness in the range 0.05 to 15 mils,
(2) positioning said veneer on said substrate in register with the adhesive composition therebetween, and
(3) while maintaining said veneer and substrate under at least contact pressure subjecting said adhesive composition to ionizing radiation at a dose rate in the range 0.00001 to 25 megarads/second to cure the adhesive.

31. The method according to claim 30 wherein the veneer is a member of the group consisting of plastic and wood.

32. The method according to claim 31 wherein the plastic is a vinyl plastic.

33. The method according to claim 30 wherein the substrate is a member of the group consisting of wood, chipboard, hardboard and wallboard.

34. An article of manufacture comprising a veneer bonded to a substrate with an adhesive composition consisting essentially of 98 to 2 percent by weight of said composition of a polyene containing at least two reactive unsaturated carbon to carbon bonds per molecule derived from a member of the group consisting of epoxy, amide, urethane, and ester containing precursor and 2 to 98 percent by weight of said composition of a polythiol containing at least two thiol groups per molecule, the total combined functionality of (a) the reactive unsaturated carbon to carbon bonds per molecule in the polyene and (b) the thiol groups per molecule in the polythiol being greater than four, said composition having a thickness in the range 0.05 to 15 mils and being curable by ionizing radiation.

References Cited

UNITED STATES PATENTS

| | | | |
|---|---|---|---|
| 3,530,100 | 9/1970 | D'Alelio | 260—88.3 X |
| 3,484,418 | 12/1969 | Vandenberg | 260—830 S |
| 3,476,718 | 11/1969 | Vandenberg | 161—265 X |
| 3,465,064 | 9/1969 | Signouret | 260—775 |
| 3,448,112 | 6/1969 | De Acetis et al. | 260—294.8 |
| 3,316,324 | 4/1967 | Mendoyanis | 260—830 S |

ROBERT F. BURNETT, Primary Examiner

M. A. LITMAN, Assistant Examiner

U.S. Cl. X.R.

156—272; 161—183, 189, 192, 213, 226, 253, 270, 412, Dig. 2; 204—21; 260—830, 836, 837